Jan. 30, 1934.  A. G. RAYBURN  1,944,999
POWER APPARATUS
Filed Oct. 28, 1929   6 Sheets-Sheet 1

Inventor
Alden G. Rayburn
By Strauch & Hoffman
Attorneys

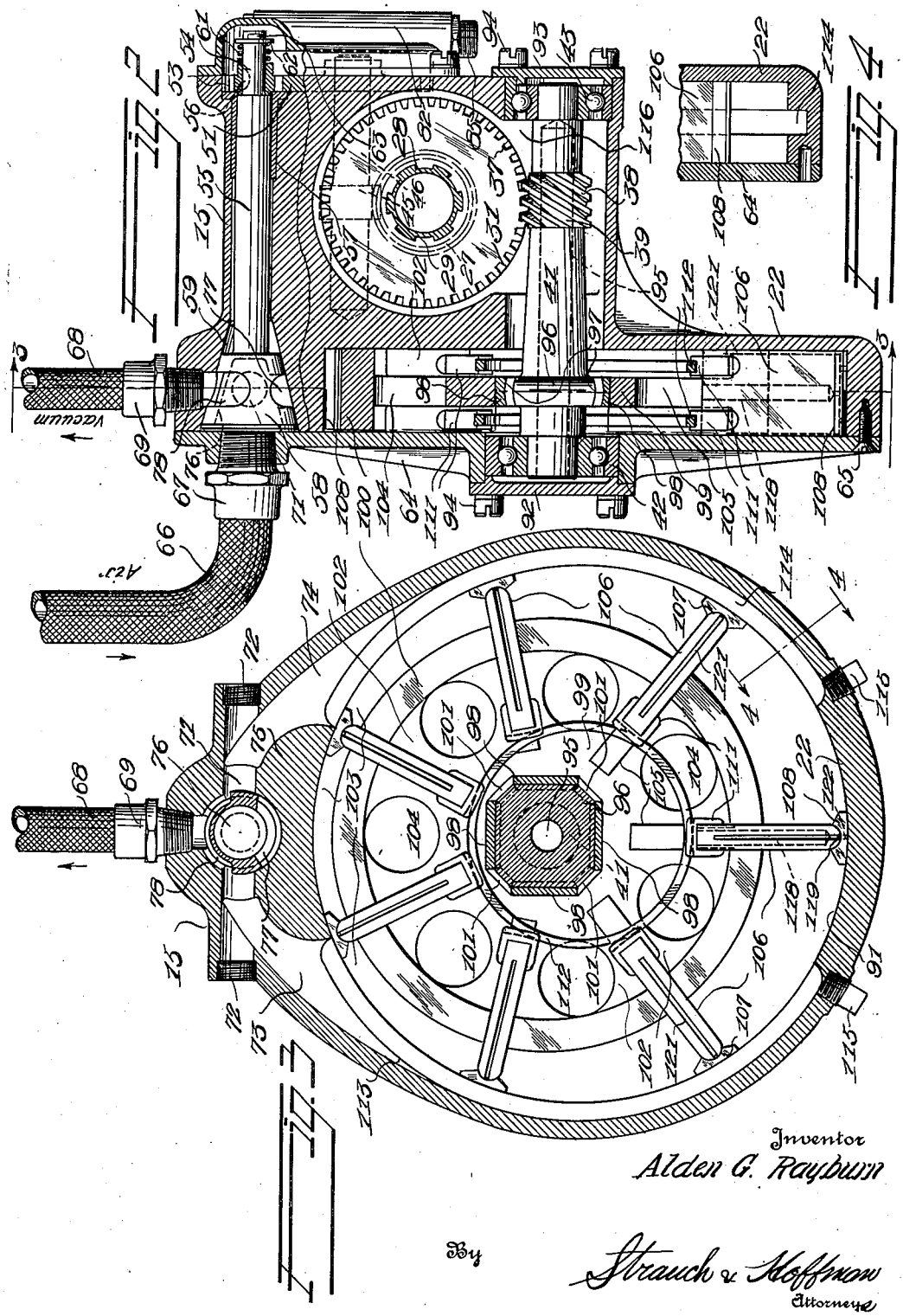

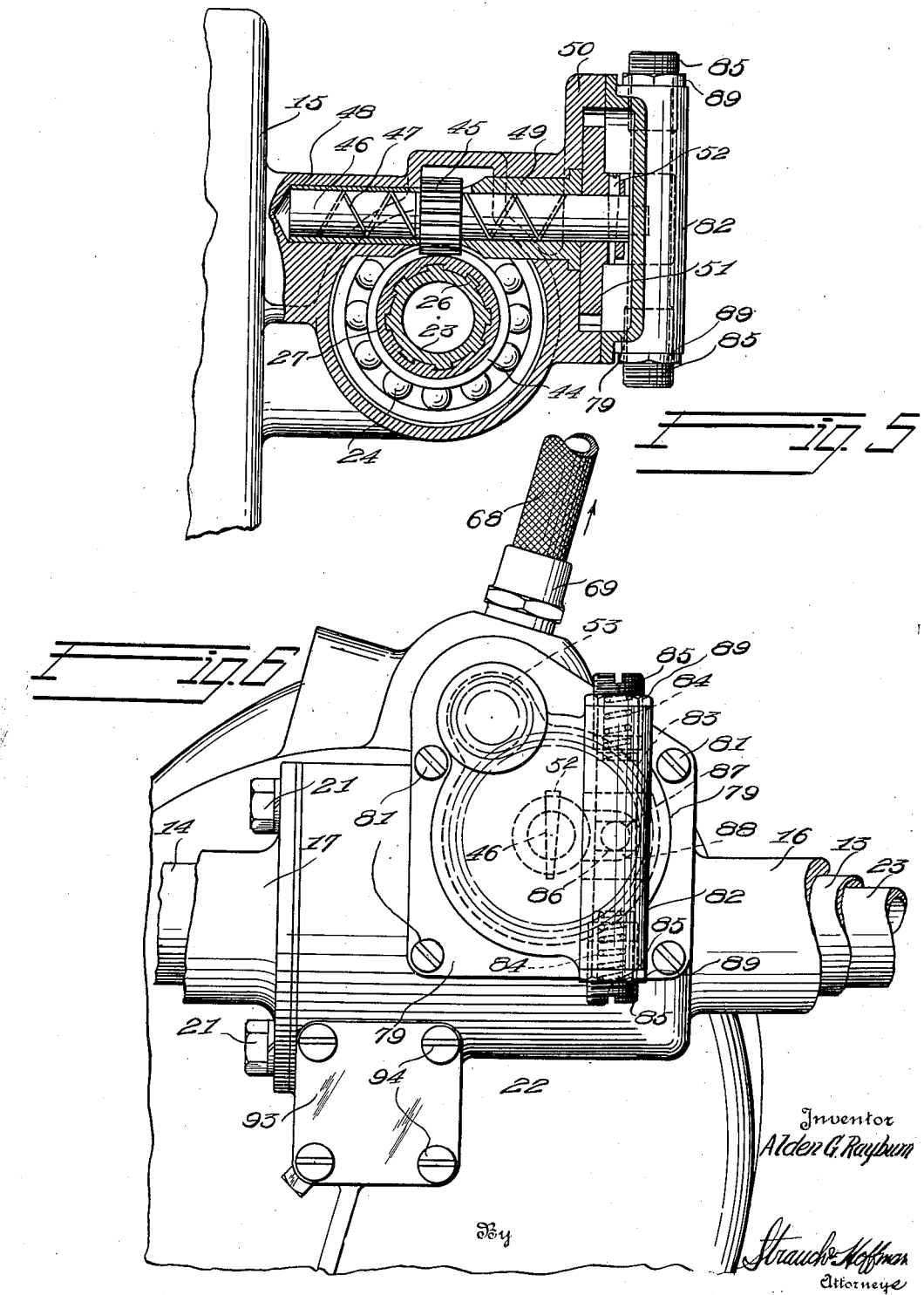

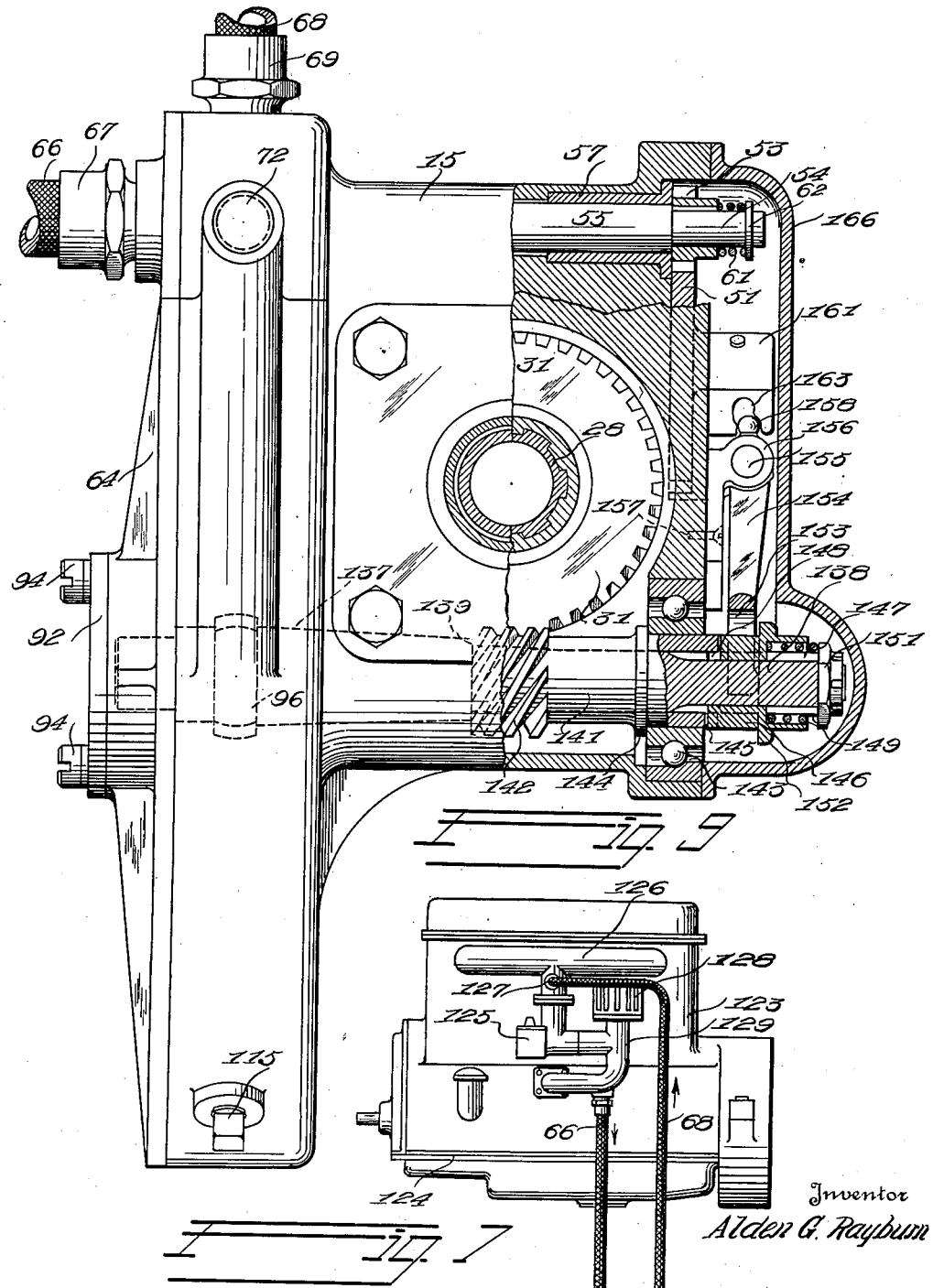

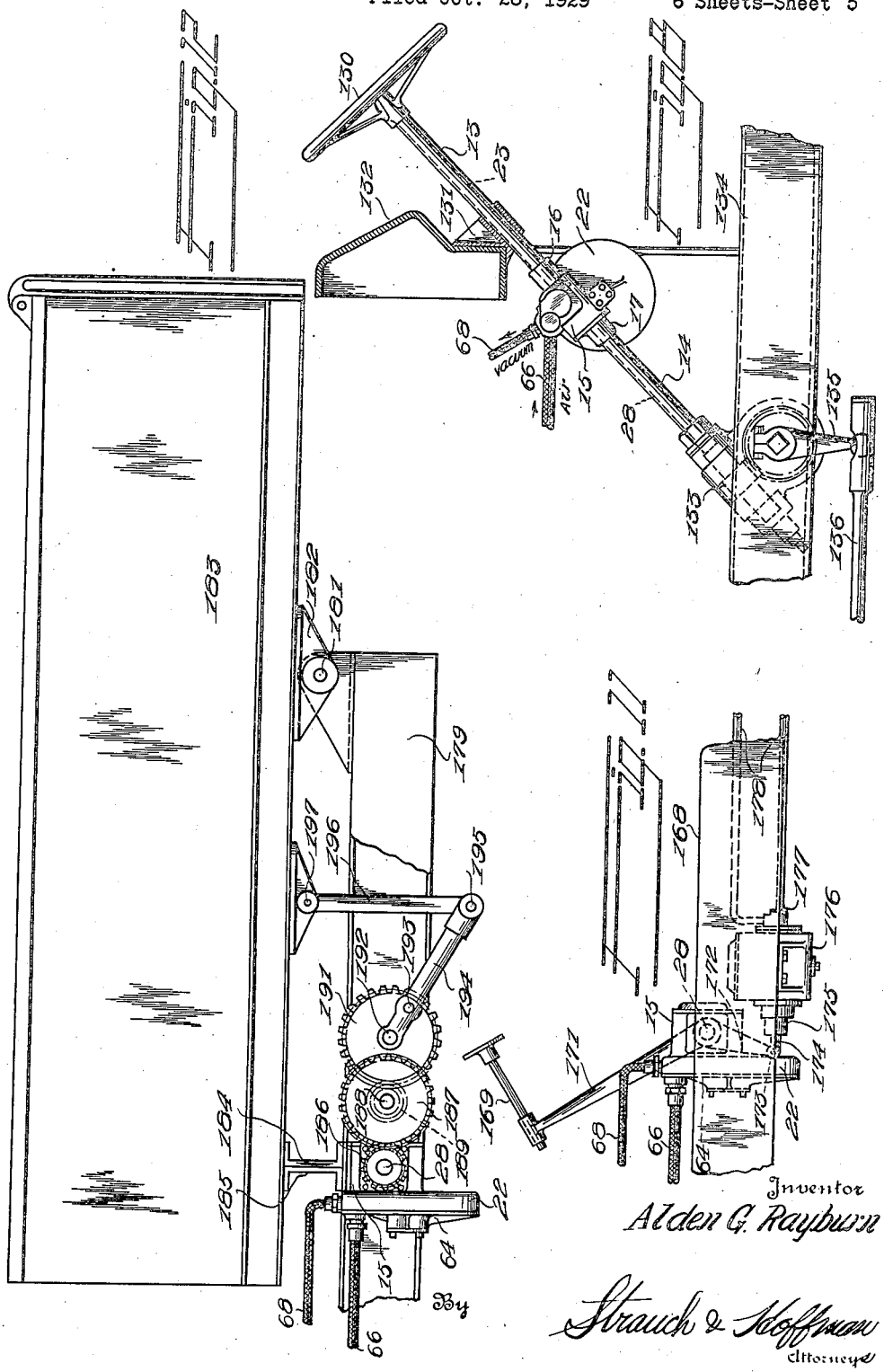

Jan. 30, 1934.  A. G. RAYBURN  1,944,999
POWER APPARATUS
Filed Oct. 28, 1929    6 Sheets-Sheet 6

Inventor
Alden G. Rayburn

By
Strauch & Hoffman
Attorneys

Patented Jan. 30, 1934

1,944,999

UNITED STATES PATENT OFFICE 1,944,999

POWER APPARATUS

Alden G. Rayburn, Sausalito, Calif., assignor, by mesne assignments, to Automotive Engineering Corporation, a corporation of Delaware Application October 28, 1929. Serial No. 403,002

4 Claims. (Cl. 121—41)

This invention relates to power apparatus, particularly of the type wherein a servo-motor is utilized to impart a limited degree of movement to a member to be driven. More specifically, the invention relates to apparatus of the type including a member adapted to be driven by a motor and/or a manually operable member, with a follow-up mechanism associated with said members and adapted to control the operation of the motor.

The apparatus of my invention, and the component parts thereof, though adapted for any one of a plurality of innumerable uses, has been especially designed for use on road vehicles driven by combustion engines, wherein the most convenient source of power lies in the vacuum produced in the intake manifold and wherein available space is at a premium and weight must be kept at a minimum. As specific examples, servo-motor apparatus may be utilized to open and close doors, operate the vehicle brakes, or actuate the steering gear.

There is a most urgent need, particularly on automotive busses and trucks, for a commercially practical power steering apparatus that is compact, light in weight, inexpensive and perfectly safe. The trend in the industry is toward manual steering operation with a great step-down in the gearing in order to secure mechanical advantages by rotating the steering wheel through an enormous arc to obtain a slight movement of the steering arm which actuates the drag links. Even with such a high speed reduction it is very difficult to turn the wheels of heavy vehicles, and the advent of balloon tires has multiplied this disadvantage because of the increased contact area on the road surface. It is likewise a tremendous task, especially for women drivers of which there are many today, to manipulate the dirigible wheels of lighter pleasure vehicles when driving at low speeds and when at rest, as in parking to the curb in congested areas. Furthermore, the high speed reduction to secure the mechanical advantage mentioned above causes many accidents, in that the driver is unable to move the wheels quickly enough in making turns and in swerving to avoid obstacles in the roadway. There is yet another danger, and from this the accidents are almost inevitably fatal. When a tire blows out while traveling at relatively high speed, the vehicle becomes ditched before the operator is aware of the incident. In heavy bus work it is improbable that the driver might be able to keep the machine on the road even if he were on the alert to cope with any emergency that might arise.

Various attempts have been made to incorporate power apparatus with steeering devices. Most of these have been impractical because of the direct association of the apparatus with the gear mechanism and steering arm of the steering device to render the completed job too complex and expensive. Also, attempts have been made to devise power apparatus that may be connected to the prime mover of the vehicle to be actuated in response to suction produced by the vacuum in the cylinders of said prime mover. This represents a step in the right direction, since the use of vacuum eliminates the need for an auxiliary fluid pump that would otherwise be necessary. Moreover, vacuum is an ideal power source because it is low at high vehicle speeds (when the dirigible wheels are easy to turn) and it is high at low speeds of the vehicle and when the engine is idling, as in parking, (when the wheels are manipulated with great difficulty). However practically all the work done along this line has involved servo-motors of the reciprocating piston type. In view of the low pressures obtainable (8–14 lbs. being the maximum, depending upon the evacuating efficiency of the prime mover) servo-motors of this type have had to be made large and with long piston strokes in order to develop the power necessary to assure proper steering, braking, etc. Indeed, most of them have embodied multiple cylinders to overcome this difficulty. Such devices are too large and too heavy to form satisfactory equipment for road vehicles and, aside from this, the cost is prohibitive. For these reasons, suction motors of this type have not gone into extensive commercial use.

The broad object of my invention is to solve all of the problems and overcome all of the difficulties above mentioned, and accordingly the main objects of the invention may be summed up briefly as follows:

1. To provide a compact and inexpensive servo-motor apparatus which may be adapted readily to various uses.

2. To equip such an apparatus with an improved follow-up mechanism.

3. To so design such an apparatus that it shall be especially adapted for operation with vacuum as the power source and atmospheric air as the pressure fluid; and in this connection, to add a follow-up mechanism, and a control valve which maintains both sides of the motor at equal pressures during idle periods whereby, when the motor is to stop after any particular rotation thereof, there will be no tendency for it to continue rotating and thus cause undesirable "hunting" by the follow-up mechanism.

4. Another object is to provide means for constantly urging the follow-up mechanism toward its neutral or idle position in order to prevent it from "hunting" during operation.

5. Still another object of the invention is to provide a motor the elements of which shall be perfectly balanced and maintained in fluid sealing relationship; and in this connection to equip it with a balanced valve which shall have a fluid-tight seat.

6. It is also one of my objects to design a motor of simple and light construction, this object being attained by properly balancing the parts and employing low fluid pressures to operate the motor at low R. P. M. and low temperatures.

7. A further object lies in the provision of a compact servo-motor apparatus which may be set up in a small available space on a vehicle to produce power operation of steering gear, brakes, dumping body attachments and the like.

8. More specifically, a major object of this invention is to supply, for the automotive industry and trade, a power steering apparatus which may be readily built into, or inserted in, any conventional steering column between the manual control (steering wheel) and the multiplication gearing that actuates the steering arm, and 9. To provide a direct connection between the manually actuated shaft and the power driven shaft, subject to lost motion by which the follow-up mechanism is actuated to operate the control valve.

10. A further important object is to provide a power steering apparatus with safety features for the prevention of dangerous accidents in case of tire blowouts, failure of motor supply fluid sticking of the motor, etc.

11. It is also an object to treat and filter the pressure fluid and thus inject into the servo-motor a harmless medium containing no abrasives or other foreign substances.

12. Another object is to utilize special lubrication methods and apparatus in connection with devices of the character about to be described.

Further objects of the invention will appear in the following detailed description of the preferred embodiments thereof, and are such as may be attained by utilization of the various principles, and combinations and sub-combinations hereinafter set forth and defined within the scope of the appended claims.

Figure 2 represents a section taken on line 2—2 of Figure 1, looking in the direction of the arrows. Line 2—2 is irregular in order that the gearing between the motor shaft and driven shaft may be clearly shown.

Figure 3 is a sectional view taken on an irregular line 3—3, Figure 2.

Figure 4, shows a fragmentary section taken on line 4—4, Figure 3.

Figure 5 represents a section on line 5—5 of Figure 1 to disclose a portion of the operating mechanism for the motor control valve.

Figure 6 is an elevational view seen when looking toward the near face of Figure 1.

Figure 7 discloses a combustion engine and the manner in which the vacuum (suction) and pressure conduits are associated therewith.

Figure 8 shows the device of Figures 1-6 inserted in the steering column of a vehicle.

Figure 9 shows, partially in section, a modified form of the apparatus of Figures 1-7.

Figure 10:
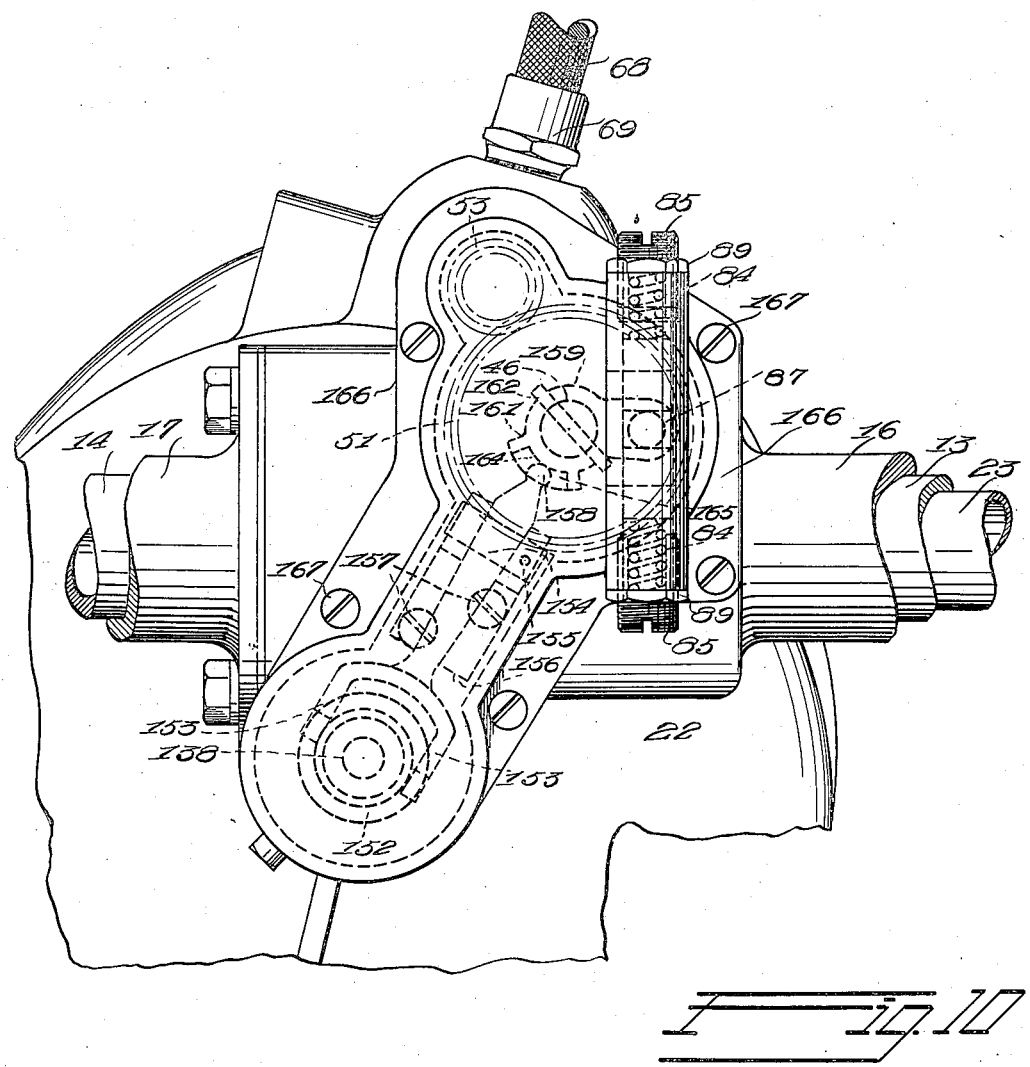

Figure 10 is an elevation seen when looking at the right side of Figure 9.

Figure 11 discloses the adaptation of my power apparatus to a hydraulic brake operating mechanism.

Figure 12 shows a further adaptation of said power apparatus to mechanism for actuating dump bodies of trucks and the like.

With reference to the drawings, particularly Figures 1-6, wherein like numerals are used to designate like parts, a pair of upper and lower tubes, 13 and 14 respectively, are stationarily mounted in any suitable manner to provide a supporting structure for the mechanism now to be described.

A main body casting 15 is stationarily mounted by means of supporting extensions 16 and 17 which receive the ends of tubes 13 and 14 respectively and are clamped thereon by lugs 18 and bolts 19. Extension 17 is secured to body 15 by studs 21, whereas extension 16 is cast integral with the body, as is also a portion 22 of a motor housing. An actuating shaft 23 is coaxially arranged within tube 16 and has its inner end journaled in body 15 by means of a bearing 24 disposed between a shaft collar 25 and the inner surface of supporting extension 16. That portion of the shaft 23, between its extreme inner end and the collar 25, is spirally threaded as at 26 to receive a correspondingly threaded follower sleeve 27.

Projecting upwardly and coaxially, through tube 14 into body 15 and substantially into contact with the end of shaft 23, is a driver (power) shaft 28. The upper end of shaft 28 has a splined fit, as at 29, with its driving gear 31. Gear 31 has an annular extension 32 journaled in a bearing 33 that is supported in the extension 17 and maintained in sealing relationship therewith by a ring 34. On its opposite side gear 31 carries a hub 35 which telescopes with a sliding fit upon splines 36 provided on the follower sleeve 27. The driving gear 31 has helical teeth 37 in meshing engagement with complemental teeth 38 on a reversible screw 39. Screw 39 is rigidly carried by the rotary motor shaft 41, which latter is journaled at its ends in bearings 42 and 43 (see Figure 2).

Figure 1:
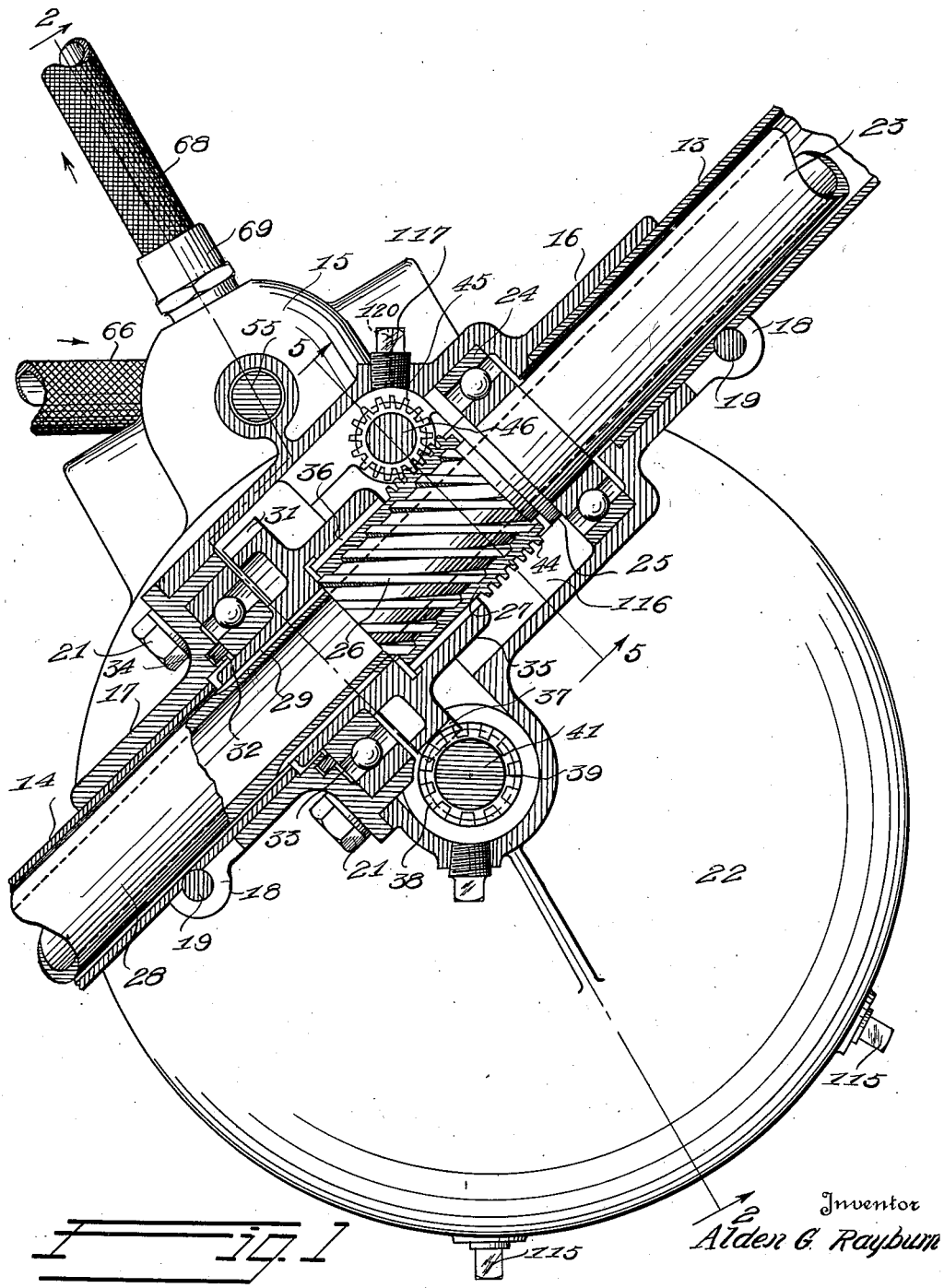
Figure 1 is a view of a preferred form of my invention, showing a section through the actuating and the power driven shafts and parts of the mechanism associated therewith.

From the foregoing description it will be seen that as shaft 23 is initially manually rotated, for example, in a clockwise direction, its helical threads 26 will cause the follower sleeve, 27, which is slidably splined in the hub of gear 31, to move upwardly longitudinally of said shaft. In so doing, as will be fully explained later, the sleeve actuates a control valve which immediately causes the motor to drive, by way of screw 39 and gear 31, the driven shaft 28 in the same direction as shaft 23 was initially rotated. This actuation of gear 31 immediately causes the follower sleeve to rotate and thus move downwardly on threads 26 longitudinally of shaft 23. When the sleeve reaches the position it originally occupied it has closed the control valve and the motor has stopped. Hence, as long as the operator continues to rotate shaft 23, the motor drives shaft 28, but it stops immediately when the shaft 23 comes to rest. The follower sleeve is thus a quick acting follow-up device. Its action is just the reverse of that outlined above, when the shaft 28 is turned counterclockwise, and the motor is reversed to produce corresponding rotation of the driven shaft 28. The amount of play which sleeve 27 has is dependent upon its relative length, i. e., the distance from each of its ends (when in neutral position as shown in Figure 1) to the abutments provided by the bearing 24 and the face of gear 31. In the event that the motor fails to operate for any reason, a direct positive couple is obtained between shafts 23 and 28 as soon as the sleeve 27 thrusts against one of its end abutments and is unable to move any further longitudinally of the threaded section of shaft 23.

The motor control valve and the mechanism interposed between it and the follower sleeve will now be described.

Sleeve 27 has, on the upper end of its outer periphery, a set of parallel circular teeth 44 which mesh in rack and pinion style with corresponding teeth on a pinion 45. The latter is carried by a shaft 46 which is provided with oil grooves 47 and journaled in the body casting 15 by means of bearing bushings 48 and 49. Adjacent one end of shaft 46, the casting 15 is shaped to provide an extension 50 for receiving a step-up gear 51. This gear, externally toothed, is secured to shaft 46 by means of a pin 52 in its hub portion, and meshes with a small pinion 53 (see Figures 2 and 6). Pinion 53, being secured to a reduced extension 54 of a rotatable valve stem 55 by means of a rockable key 56, causes oscillation of said valve stem whenever the step-up gear 51 is oscillated. Valve stem 55 is supported in the top of body 15 by a bearing bushing 57 and carries, on its opposite end, an oscillatable conical valve 58 the outer surface of which fits snugly into a conical seat 59 formed in the body casting 15. Means are provided for urging the valve toward its seat to maintain a tight fluid seal, comprising a compression spring 61 interposed between the pinion 53 and a washer 62 upon the extension 54, the washer being held in position by a cotter pin 63.

A large cover plate 64 (Figure 2) is secured, by countersunk screws 65, upon the left face of body 15 to close the valve opening, and to complete the motor housing by virtue of its association with body 15 and portion 22. A fluid supply conduit 66 communicates with the large end of the valve by way of a hollow terminal plug 67 which is threaded through cover plate 64. An exhaust conduit 68 communicates with the upper side of conical valve seat 59 through a similar plug 69 screwed into an opening in body casting 15. I prefer to supply atmospheric air pressure through conduit 66 and to connect conduit 68 to a vacuum, but it should be understood that they may be utilized in any conventional manner as inlet and exhaust conduits.

A passage 71 is formed through the body casting 15 transversely thereof with its axis intersecting that of the valve, and its ends are closed by plugs 72. This passage, on one side of the valve, opens into a chamber 73 in one side of the motor housing, and on the opposite side of the valve it communicates with a chamber 74 formed in the other side of the motor housing, chambers 73 and 74 form the working sides of the motor and are separated from each other by a sealing segment 75 which is cast as a part of the body 15.

The conical valve plug 58 is cored out from its large end to provide a central pressure chamber 76 which is always in communication with supply line 66. This central chamber opens into an elongated peripheral port 77 which is just sealed (when the valve is in neutral position, as shown) by that surface of segment 75 which forms part of the vlave seat. Adjacent the exhaust nipple 69 a peripheral groove is cut on the valve to form a port 78 of such length as to just establish communication between the exhaust (vacuum) line and both working sides of the motor. The motor thus has no tendency to rotate with the valve in the illustrated (neutral) position, or to continue rotation after it has been operating and the valve has been shifted to neutral. A slight turn of the valve in a clockwise direction (Figure 3), as is apparent, places chamber 73 under pressure and connects chamber 74 to vacuum, thus causing the motor to operate. Oscillation of the valve in the opposite direction reverses the connections and causing a corresponding reverse operation of the motor. The ends of ports 77 and 78 are so curved and so related to the passages 71 that the operating fluid connections are made gradually, rather than suddenly, with the result that the motor starts and stops with uniform acceleration and deceleration respectively.

In order to prevent the follower sleeve 27 from "hunting" (shifting to and fro past its neutral position) and to urge the valve at all times toward its neutral position, the following mechanism is provided:

A cap 79 is secured by machine screws 81 to the body 15 in order to cover the exposed portions of the elements which connect shaft 46 with the valve stem (see Figure 6). This cap is provided with an integral cylinder 82 in which is disposed a reciprocable plunger 83. A compression spring 84 is placed in each end of the cylinder with one of its ends pressed against the corresponding end of the plunger by a threaded plug 85. A transverse slot 86 is cut in one side of the plunger intermediate the ends thereof to receive a crank pin 87 carried on the end of a crank 88, the latter in turn being secured upon the shaft 46 for oscillation therewith. The plugs 85 are adapted to receive a screw driver for adjustment to vary the forces exerted on the plunger ends by the springs. For proper working, the spring compressions are so adjusted that, when the control shaft 23 is idle, the plunger slot urges the crank pin, crank, shaft 46, etc., to such position that the control valve 58 rests in the neutral position illustrated in the drawings. Plugs 85 are locked in position, after each adjustment, by nuts 89.

It has already been pointed out that the body casting 15 with its extension 22 cooperates with cover plate 64 to form a motor housing. These parts, when joined, provide a cylindrical motor chamber 91 the inner surfaces of which have been nicely machined to receive a rotor prior to attachment of cover plate 64. The motor shaft 41, previously described, is mounted with its axis parallel to, but eccentrically disposed with respect to, the axis of the cylindrical motor chamber 91. The ends of the shaft are supported in the bearings 42 and 43, arranged in openings in the cover plate and body casting respectively and held against longitudinal play and thrust by respective caps 92 and 93, which are in turn secured by machine screws 94. The motor shaft is hollow, as at 95, to decrease the overall mass of the machine. The rotor which is mounted on shaft 41 to operate in the motor chamber 91 will now be described.

That portion of the motor shaft which is disposed in the motor chamber is enlarged into an approximately square member 96, the radial sides of which are cylindrically curved, as at 97, about axes which are normal to and intersect the axis of the shaft. Four wearing strips 98 have their inner surfaces curved to fit rockably upon the four cylindrical surfaces of the member 96, and their outer surfaces flat and related to each other like the sides of a parallelepiped. These outer flat surfaces slidably fit within a substantially square opening in a rotor body 99. The places designated by numerals 101 are open corner spaces between the ends of strips 98. The above construction provides a universal mounting for the rotor upon the motor shaft, permitting it to move universally and thus adjust itself under all conditions to prevent scoring of the motor chamber or damage to any motor parts. A more detailed disclosure and description of this joint will be found in my copending application, Serial No. 380,357, filed July 23, 1929.

The rotor 99 is cylindrical in general outline and, as seen in Figure 2, is approximately I-shaped in cross section. It is eccentrically disposed within the motor chamber and its annular outer rim 100 sealingly engages the chamber side walls to form a pair of internal annular cavities 102 and separate them from the space 103 surrounding said rotor rim. These cavities are interconnected by holes 104 in the rotor body, such holes serving primarily to reduce weight. A radial slot 105 is cut through the full width of the rotor between each pair of adjacent holes 104, and within each slot a motor blade or vane 106, shorter in length than the slot, is fitted for bodily movement with the rotor and for simultaneous radial reciprocation relative thereto. These blades are of the full width of the chamber and at their outer extremities have cylindrically curved tips 107 which fit into cylindrical seats in slippers 108. The slippers are thus adapted to rock about the blade tips to cause the outer slipper surfaces (which have the same curvature as the cylindrical wall of the motor chamber) to coincide at all points thereon with the chamber wall which they slidably engage, thus to maintain a perfect seal in spite of rotor eccentricity. To force the blades into their operative positions in the slots I provide for each blade a pair of shoes 111, one shoe at each side of the rotor body, and arrange a pair of slightly resilient steel rings 112 within the respective pair of cavities 102 with the outer ring surfaces in sliding engagement with said shoes to force them outwardly.

The motor chamber 73 merges with an arcuate channel 113 which (see Figures 3 and 4) extends along the annular wall of the motor housing to a point near the bottom of the latter. A similar channel 114 merges with chamber 74. The lower ends of channels 113 and 114 are spaced apart a distance slightly less than that between any pair of adjacent slippers 108, in order that they shall not be interconnected at any time by the spaces between the blades. Plugs 115 are provided to remove any foreign matter that may accumulate in the channels.

From the above description it will be apparent that when the control valve is manipulated to place chamber 73 under pressure and chamber 74 under exhaust, the pressure fluid will pass through channel 113 into all of the left hand spaces (Figure 3) formed by the blades, the housing and the rotor rim; and that all of the corresponding spaces on the right side will exhaust through channel 114 into chamber 74. The rotor and its blades thus rotate counterclockwise. An opposite rotation results, of course, when the valve connections are reversed.

The entire space 102 within the rotor rim 100 is kept full of lubricant in the following manner: Lubricant is poured or injected into the gear chamber 116 (see Figures 1 and 2) by way of the opening which is normally closed by a filler plug 117. It then passes into the rotor cavities 102 by way of the space surrounding the motor shaft. The lubricant level is normally maintained as high as the bottom of the filler plug, and hence all bearings, gears, etc. are kept properly lubricated with a minimum of attention on the part of the operator. Since the lubricant is under atmospheric pressure through hole 120 in plug 117 and the outer face of cover plate 64 is likewise exposed to atmospheric pressure, the motor will be perfectly balanced with no tendency for the central area of the cover plate to "dish" or become distorted in any way. The motor chamber space 103 surrounding the rotor rim 100 is sometimes completely, and sometimes partially, under vacuum, and the external air pressure upon the adjacent annular portion of the cover plate causes the latter to be pressed firmly against the body casting 15 and its extension 22 to provide an effective fluid seal.

A radially extending hole 118 is drilled through the inner end of each rotor blade and terminates in a transverse surface groove 119 on the blade tip. The groove 119 has its opposite ends in communication with a pair of radial grooves 121 cut in the blade edges. Each blade slipper has several short radial passages 122 drilled through it to establish communication between its outer cylindrical surface and the groove 119. In order to avoid confusion in Figure 3, only one blade has been fully detailed in accordance with the above description. Lubricant from the center of the rotor, aided in its passage by atmospheric pressure and centrifugal action during motor operation, is fed radially outwardly into the holes 118 and thence passes through the described grooves and passages to thoroughly lubricate all running surfaces and to increase the efficiency of the fluid seal between the working sides of the motor.

In Figure 7 I have illustrated a preferred manner of utilizing the vacuum produced by the suction strokes of a combustion engine, when atmospheric air is to be used as the pressure source for operation of the power apparatus of this invention. A conventional engine 123 is shown, having a crank case and oil pan structure 124, a carburetor 125, and an intake manifold 126. The exhaust (suction) conduit 68 of the motor is connected to the intake manifold as at 127. A filtering device 128 is provided for cleansing the air that is drawn into the manifold to support combustion in the engine. A pipe 129 is inserted between the device 128 and the crank case in order that clean air may also be breathed by the latter. To this pipe 129 I connect the inlet conduit 66 of the servo-motor and thus obtain harmless filtered air for use therein. Some oil vapors from the crank case, including combustibles that collect therein from leakage past the engine pistons, inevitably pass through the lower end of pipe 129 and thence through the conduit 66 into the servo-motor, thus providing another source of lubrication therefor. These vapors then return to the engine through conduit 68 and are burned with the charges therein. Thus my power apparatus increases the efficiency of the combustion engine, and also ventilates the crank case to remove such vapors as decrease the value of the crank case oil.

Figure 8 illustrates the particular adaptation of the power apparatus to the steering mechanism of a vehicle. This construction and arrangement is conventional except for the fact that the steering column has been cut for the insertion of a power device. The manner of insertion of the apparatus of Figures 1–6, and 10, 11, will be obvious. The external column sections 13 and 14 of Figure 8 correspond with the supporting columns 13 and 14 of the other figures. Section 13 is carried by a bracket 131 secured to the dash 132 and houses the actuating shaft 23 to which is connected a steering wheel 130; and section 14 is supported in a conventional steering gear mechanism 133 carried on the frame 134. Mechanism 133 is operable by the driven shaft 28 to actuate the steering arm 135, which in turn operates the drag link actuator 136.

A brief summarization of the operation of the completed assembly in Figure 8 follows:

If the driver wishes to steer the vehicle to the right, he starts to turn the wheel 130 toward the right, and in so doing he oscillates shaft 23 sufficiently to take up some of the lost motion provided by follow-up sleeve 27 on the helical threads 26. Sleeve 27 immediately rises on shaft 23, oscilating pinion 45 through a slight angle. This results in immediate oscillation of the control valve through a much greater angle (in counterclockwise direction, Figure 3) because of the step-up gearing interposed between pinion 45 and the valve stem. A practically instantaneous response of the motor is thus obtained, the latter rotating clockwise to drive the shaft 28, by way of the non-locking reversible screw 39 and the drive gear 31, in the same direction as the steering wheel was rotated. So long as the operator keeps the steering wheel moving relatively fast the follower sleeve is kept above its neutral position and the motor continues to operate. At the instant, however, that he stops the steering wheel, the drive gear 31 causes the sleeve to climb down the threads 26 to its neutral position, at which instant the control valve places both sides of the motor under vacuum and its operation is discontinued. A reverse operation is obtained when the steering wheel is moved in the opposite direction.

My power apparatus is extremely light in weight and compact in size and this, together with the features of design, render it inexpensive to manufacture. I am able to make it light in weight because of its simplicity and the use of low pressures and low R. P. M., with consequent low operating temperatures. I am able to build it compactly because of the use of an improved rotary motor especially combined with the remaining structure to develop a high driving torque. To make sure that this midget motor will supply the necessary torque under the most adverse conditions, the multiplication ratio of the elements 31 and 39 is made relatively high (e. g. 7 to 1, as shown).

This high ratio also has great importance as a safety feature for, when a blowout occurs or any like situation arises with a tendency to quickly turn the dirigible wheels and thereby ditch the vehicle, such tendency is resisted and turning prevented. Not only do the rotor and screw 39 resist rotation of shaft 28, but the control valve is immediately actuated in response to any slight rotation of shaft 28 in such manner that the motor attempts to operate in a direction that will oppose the turning of the wheels occasioned by the blowout.

The apparatus further serves as a shock absorber by absorbing or dampening all vibrations and shocks set up by the irregularities in the road surface, and which would otherwise be transmitted from the vehicle wheels to the steering wheel and thence to the driver's arms to annoy and fatigue him.

As previously pointed out, in the event that the source of power fails (as when the engine is dead or the vacuum line is ruptured), the wheels may be manually steered for when the follower sleeve 27 reaches the limit of its movement it establishes a direct couple between the shafts 23 and 28 by way of gear 31. Gear 31, however, operates the screw 38 and thereby oscillates the rotor during such movement.

There is a slight possibility, however improbable, that the motor might become locked to prevent manual operation, as by sticking of the rotor, or accidental closure of one of the supply and exhaust conduits. Such an incident might result in great personal and property damage and to avoid this I have, as disclosed in Figures 9 and 10, added a safety feature to the apparatus of Figures 1–6 inclusive.

Figures 9 and 10 correspond with Figures 2 and 6 except for the following changes and additions: The motor shaft proper comprises a tapered portion 137 having a reduced extension 138 to form an annular shoulder 139. A sleeve 141 is journaled upon extension 138 with one of its ends abutting the shoulder 139 and provided with an integral screw 142 in driving engagement with the gear 31. The opposite end of the sleeve is journaled in a bearing 143 with its collar 144 in surface engagement therewith, and is notched at its outer extremity to provide a set of dogs 145. A clutch sleeve 146 is splined as at 147 for longitudinal sliding movement upon the end of the shaft extension 138. The inner end of the clutch sleeve 146 has a set of dogs 148 which are normally shoved into driving engagement with the dogs 145 of sleeve 141 by means of a compression spring 149 pressed against sleeve 146 by a nut 151, threaded upon extension 138. If, however, one should shift the clutch sleeve toward the right in Figure 9 to declutch the dog coupling, the screw 142 would be free to rotate independently of the rotor shaft 137, 138, and shaft 28 could thus be manually actuated with the motor inoperative. To automatically cause such a declutching operation in case of emergency, the following mechanism is added:

An integral collar 152 on clutch sleeve 146 is adapted to be engaged by the forked arms 153 of a lever 154 that is mounted on a stationary pivot pin 155 (see also Figure 10). Pivot pin 155 is supported by a bracket 156 attached to the body casting 15 by screws 157. The upper end of the lever 154 is provided with a ball 158. The step-up gear 51 carries, in lieu of the crank arm 88 shown in Figure 6, a combined crank arm and camming device, comprising a crank 159 positioned by the pin 87 and a cylindrically shaped extension 161, all secured to shaft 46 by a pin 162. The extension 161 has formed therein an irregular shaped cam slot 163 for cooperation with the ball 158. In the neutral position illustrated in Figures 9 and 10, the cam slot has no effect upon the ball 158, but when shaft 46 oscillates to cause either of the cam portions 164 and 165 (Figure 10) to contact with the ball surface, the ball 158 is thrust towards the body casting 15 to swing lever 154 about its pivot and thereby disengage the dogs 145 and 148. Hence, if the operator manipulates shaft 23 to actuate the control valve and the motor does not immediately respond, he may exert sufficient force upon the steering wheel to shift the cam to one of its extreme positions, thus declutching the motor and rendering shaft 28 subject to manual operation.

A redesigned cover plate 166 is attached to the body 15 by screws 167 to cover the exposed mechanism above described.

In Figures 11 and 12 there are illustrated several of the other numerous uses to which the power apparatus is readily adapted.

Figure 11 discloses a chassis frame 168 upon which my servo-motor apparatus is mounted. A brake pedal 169 is carried on a lever arm 171 which may be connected to shaft 23 (see Figure 1) to actuate the same upon depression of the pedal. The shaft 23 is behind shaft 28 in Figure 11 and hence is not seen, but its connection with arm 171 will be readily understood without a detailed showing. The driven shaft 28 carries an arm 172 which is pivoted at 173 to a rod 174 that reciprocates with a plunger 175. The plunger forms part of a conventional hydraulic fluid pressure distributing system 176. The plunger 175 forces fluid such as oil into a coupling 177 and thence it is pressed into pipe lines 178, one of which may lead to the hydraulic brakes of the front wheels and the other to the rear wheel brakes. Thus, when pedal 169 is depressed, the motor is started and drives shaft 28, thereby oscillating arm 175 to operate the braking system. It will readily be understood that the hydraulic mechanism 174—178 may be dispensed with and the arm 172 utilized to operate the actuating rods of the mechanical brakes.

In Figure 12 there is shown a portion of the frame 179 of a hauling truck. The end of the frame carries a transverse trunnion 181 which pivotally supports a bracket 182 secured to a dump body 183. The center of gravity of body 183, loaded or unloaded, is disposed forwardly of the trunnion so that a substantial part of the body load is applied as at 184 upon a frame-supported I beam 185.

The servo-motor apparatus is mounted on the frame adjacent the I beam. The driven shaft 23 is cut to stub form and has keyed thereon a gear 186 for driving a train of gears that tilts the dump body. This train of gears comprises a step-down gear 187 mounted upon a countershaft 188 which also carries a pinion 189 in meshing engagement with a gear wheel 191 mounted on an idle shaft 192. Journaled upon shaft 192 and pinned to gear 191 as at 193 is a relatively long oscillatable crank arm 194. At its outer end, crank 194 is pivoted as at 195 to a lifting link 196 which in turn is pivoted as at 197 to the dumping body. The motor operates shaft 28 to oscillate crank 194, by way of the gear train, in a counterclockwise direction. This results in a lifting movement of lever 196 to cause the body to tilt on trunnion 181 and dump its load. Reversing the motor returns the body to the position illustrated. Any convenient type of manual control means may be attached to shaft 23 (concealed in Figure 12).

It should be understood that the structure and arrangement disclosed in Figure 7 may properly represent a portion of each or any of the other figures of the drawings. For example, the devices of Figures 7 and 8 may be readily combined by merely interconnecting the respective fluid conduits 66 and 68. In view of this situation it is deemed undesirable to show it in direct association with any particular one of said other figures, and of course it would only confuse the drawings and multiply the number of sheets thereof if the showing in Figure 7 were repeated several times.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A compact servo-motor construction of the rotary type comprising: a housing; a control shaft projecting into said housing; a motor chamber formed in said housing; a motor shaft journaled in said housing in substantially perpendicular relation to said control shaft; a rotor within said chamber and mounted upon said shaft; a valve mounted in said housing to control the operation of the motor; a lubricant reservoir formed in said housing; and mechanism for actuating said control valve, part of said mechanism being housed in said lubricant reservoir and connected to said control shaft.

2. In the apparatus defined in claim 1, said mechanism comprising a gear train between said control shaft and said motor shaft, said rotor having a central chamber; and means establishing communication between said central chamber and said lubricant reservoir, and permitting connection between said gear train and said motor shaft.

3. In a device of the character described, the subcombination of a body casting provided with an open rotor chamber, a valve recess, and a chamber disposed behind said rotor chamber for housing a valve actuating mechanism; and a cover plate secured to said body casting to close said rotor chamber and said valve recess and designed to serve as a side-wall and support for said rotor.

4. In a power apparatus of the class described, an actuating member; a driven shaft; a motor adjacent said member and said shaft, including a rotary power shaft and a coupling between said power shaft and said driven shaft; a control valve for said motor; mechanism interconnecting said actuating member and said driven shaft, including means permitting a limited amount of initial lost motion therebetween, means utilizing said lost motion to actuate said control valve; means to disconnect the coupling between said power and driven shafts; and means to cause said coupling to be disconnected when a predetermined force is exerted on said actuating member.

ALDEN G. RAYBURN.